Nov. 5, 1946.  G. L. DIMMICK  2,410,720
LENS COATING APPARATUS
Filed Nov. 22, 1943  4 Sheets-Sheet 1

Inventor
GLENN L. DIMMICK
Attorney

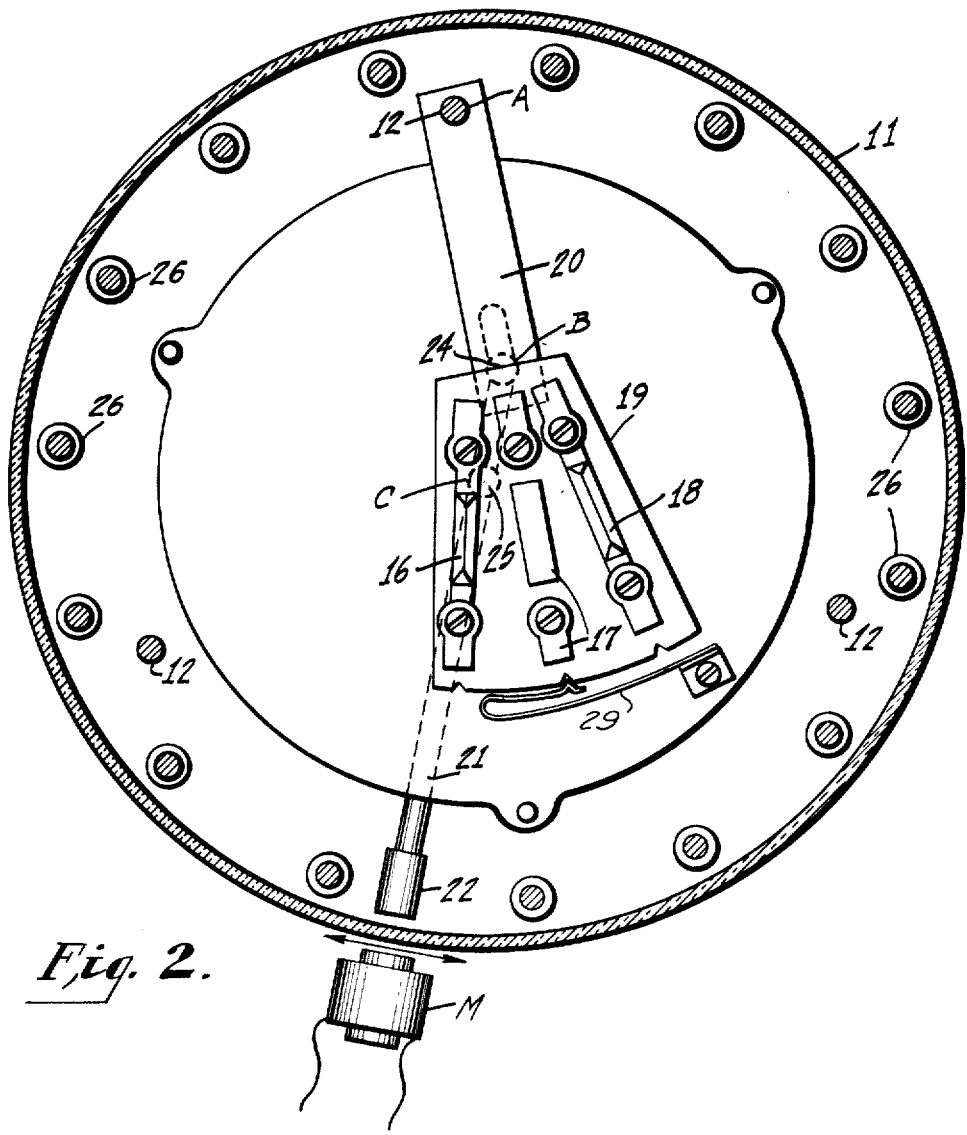

Nov. 5, 1946.   G. L. DIMMICK   2,410,720
LENS COATING APPARATUS
Filed Nov. 22, 1943    4 Sheets-Sheet 3
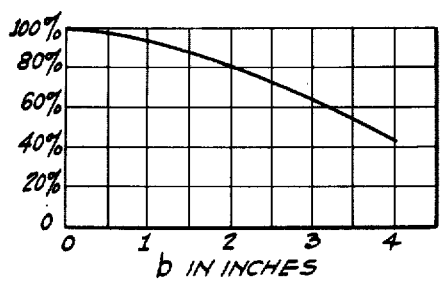
*Fig. 4.*
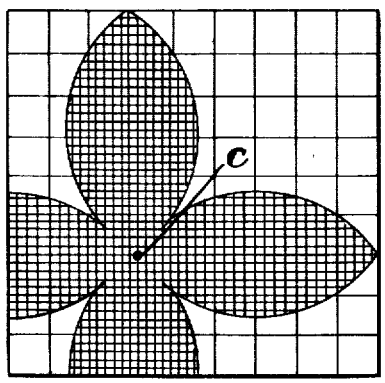
*Fig. 5.*
*Fig. 6.*
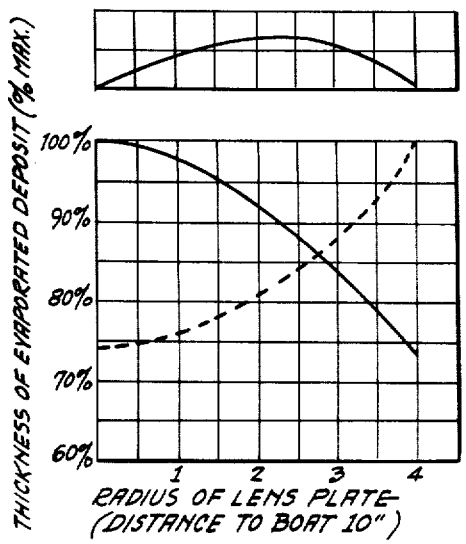
*Fig. 7.*
Inventor
GLENN L. DIMMICK
Attorney Nov. 5, 1946.  G. L. DIMMICK  2,410,720
LENS COATING APPARATUS
Filed Nov. 22, 1943  4 Sheets-Sheet 4

Inventor
GLENN L. DIMMICK
By
Attorney

Patented Nov. 5, 1946

2,410,720

UNITED STATES PATENT OFFICE 2,410,720

LENS COATING APPARATUS

Glenn Leslie Dimmick, Indianapolis, Ind., assignor to Radio Corporation of America, a corporation of Delaware Application November 22, 1943, Serial No. 511,231

14 Claims. (Cl. 91—12.2)

This invention relates to an apparatus for coating optical elements for the purpose of reducing their reflection, increasing their reflection, or rendering them selectively reflective. The apparatus involves means for applying coatings of magnesium fluoride, zinc sulphide, or other materials for such purpose.

The apparatus includes a vacuum chamber, means for evacuating the chamber, means for holding the optical elements to be coated, and means for applying the coating thereto, and together with means for securing accurate distribution with the coating and means for distributing the coating on either side of the elements being treated.

One object of the invention is to provide a method of and means for applying uniformly distributed coating to an optical surface.

Another object of the invention is to provide apparatus for selectively applying different coating materials.

Another object of the invention is to provide apparatus for placing the different evaporators of coating materials in proper relation to the optical elements being treated.

Other and incidental objects of the invention will be apparent from a reading of the following specification and an inspection of the accompanying drawings in which:

Figure 2 is a plan view looking down on the middle of the base plate,

Figure 4 is a distribution curve of evaporated material,

Figures 8, 9:
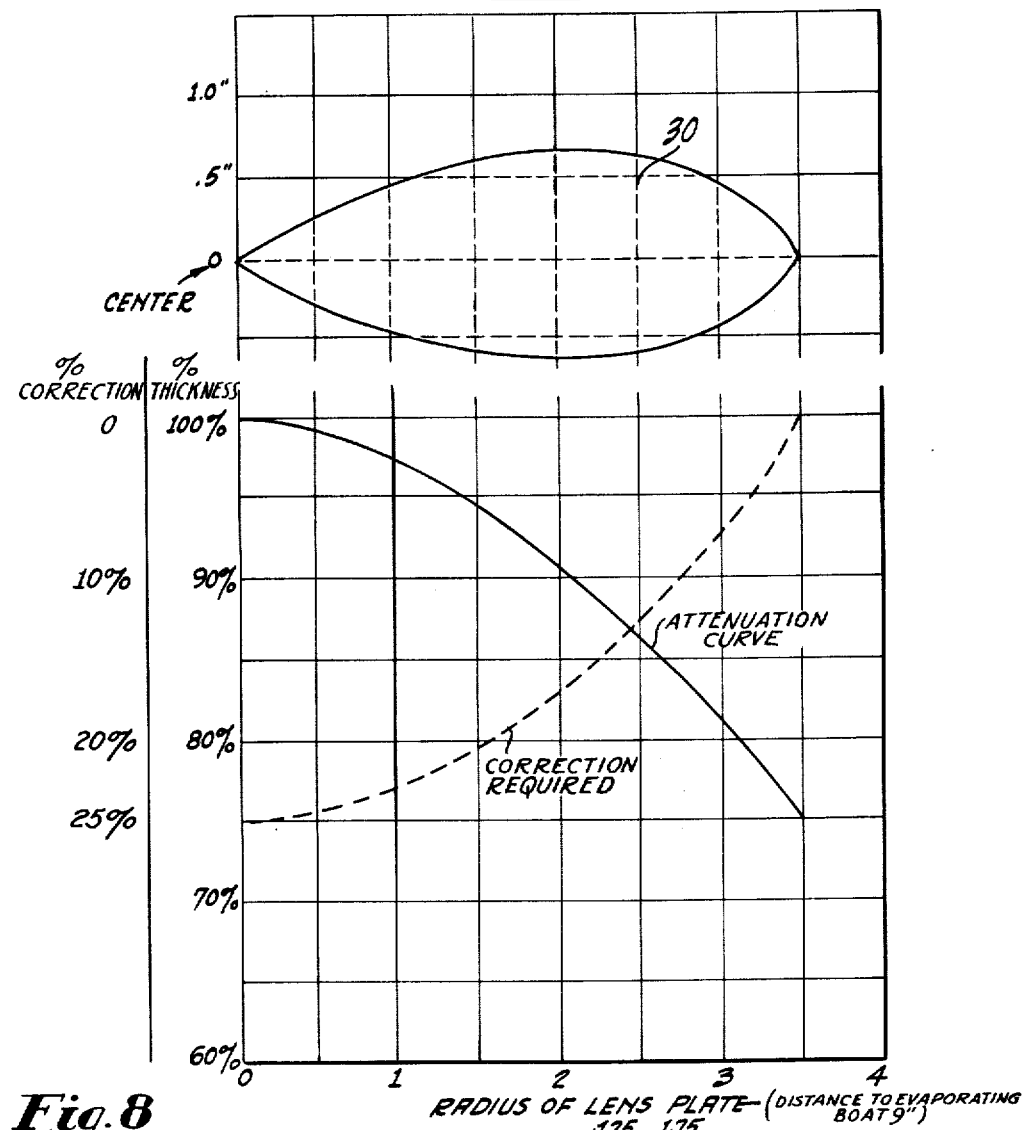

Figure 5 is one type of diffusion screen for producing a proper distribution of the evaporated material, Figure 6 is a curve showing the shape of one-half of a correcting plate, Figure 7 is a curve of the radius of the lens plate plotted against the percentage of evaporated material with the distance to the evaporating boat ten inches, Figure 8 corresponds to Fig. 7 except that the distance to the evaporating boat is nine inches, and Figure 9 is a diagram of the outline of a solid correcting plate based on the curve of Fig. 8.

Figure 1:
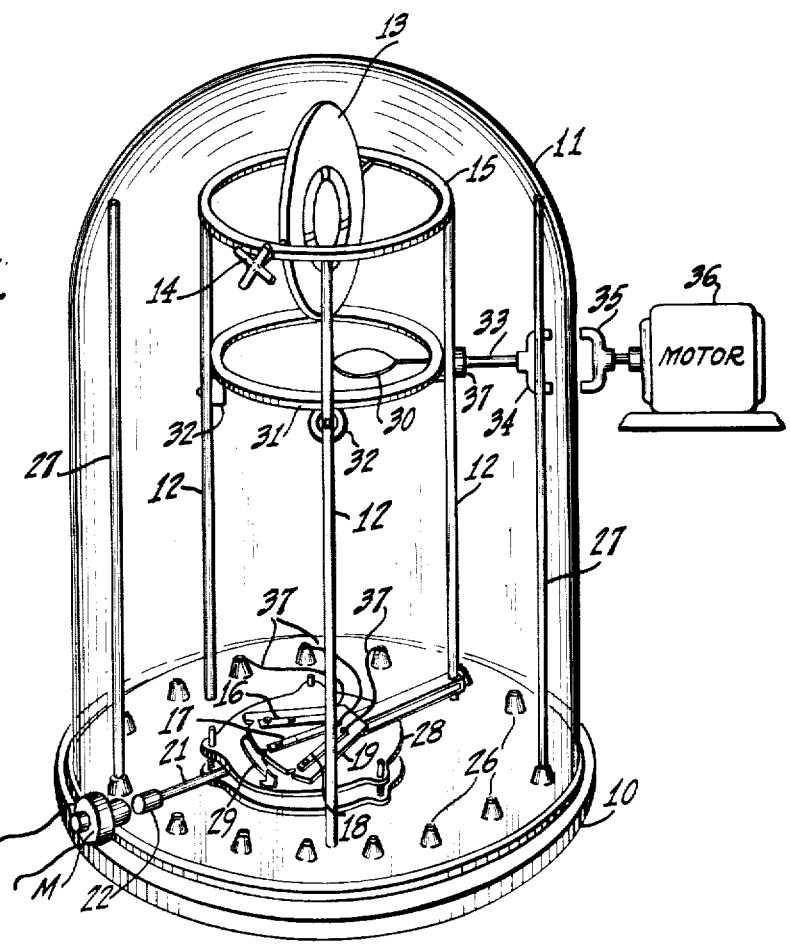
Figure 1 is a perspective view of the apparatus.

Referring first to Fig. 1, 10 indicates the base plate which may be of any appropriate material but for reasons of convenience it is preferably of steel and of a diameter upwards of 12 inches. 11 indicates a bell jar adapted to fit with a vacuum-tight seal against the base plate 10. The vacuum-tight fit of this bell jar may be secured by grinding, sealing or packing. It is most conveniently secured by a layer of semi-plastic gasket material between the bell jar and the base plate. Appropriate means for evacuating the bell jar are provided, preferably of the type generally disclosed in the application of L. T. Sachtleben, filed on October 29, 1943, Serial No. 508,267, although any other suitable means may be provided. The lenses or other optical elements are held in appropriate work holder 13 which may be reversed in position by the magnetic means 14, moved by the exterior magnet M. The work holder 13 is in a position parallel to the base 10 when the lenses are being treated. The work holder 13 is supported by a ring 15 carried on a set of three legs 12 resting on top of the base 10. When the vacuum is reduced to an appropriate point the optical surfaces are treated with ionized gas produced by ionizing the remaining gas by the magnesium electrodes 27 which are supplied with alternating current at an appropriate voltage.

Figure 3:
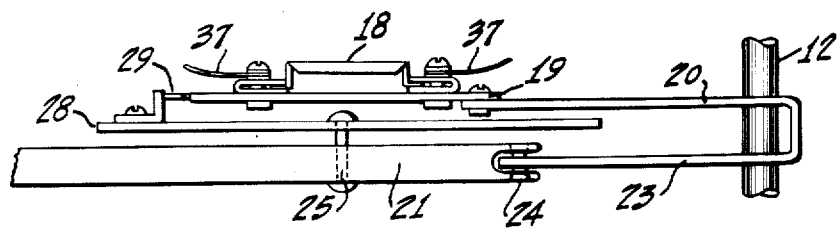
Figure 3 is a view from the right-hand side of Fig. 2.

The material to be evaporated on to the surface of the optical elements is placed in the platinum or molybdenum boats 16, 17, or 18, see also Figs. 2 and 3. Filaments may be substituted for these boats in case a material is to be used which evaporates properly from the filaments. It is necessary, in order to secure a uniform distribution of the evaporated material over the work holder 13, to have the evaporating boats aligned substantially with the middle of the work holder. If the work is to be coated with two or more different materials it is therefore necessary that the boats be moved into axial alignment selectively. The boats 16, 17 and 18 are secured on a plate 19 and are connected to the terminals 26 by appropriate wires 37 so that the boats may be selectively heated. The plate 19 may be of an appropriate insulating material to prevent short-circuiting the boats, or it may be metallic and have the boats secured thereto by appropriate insulating connections. The plate 19 is carried on the arm 20 which may be pivoted on one of the legs 12 or on some other equivalent support. The arm 20 is re-curved to form the movable arm 23 which is actuated by the arm 21. The arm 21 is pivoted at 25 at substantially the center of the base plate 10 and of the bell jar 11. An armature 22 is secured to the end of the arm 21 and moves within the bell jar 11 reasonably close to the surface thereof. By reason of the pivot point of the arm 21, the armature 22 moves substantially parallel with the bell jar and is moved from position to position by the external magnet M which may be an electro-magnet or a permanent magnet. The arm 21 is connected to the arm 23 by a sliding pivot at 24. The plate 19 is secured in the several positions of the boat by a spring latch 29 carried on the base plate 28 which is supported above the base of the bell jar and to which the pivot of the arm 21 is also secured.

The thickness of the coating varies according to the distance from the evaporating boat to the lens plate or work holder. In my application, Serial No. 468,915, I disclosed one method of compensating for this effect by using three separate similar boats and a triangular wire screen. In the present arrangement the use of three separate similar boats is not practical in view of the fact that layers of different materials are to be deposited during one evacuation of the jar.

One arrangement for securing uniform spreading of the evaporating material is shown in Figs. 4 and 5. In Fig. 4 is plotted the distribution of material against the radius of the lens plate indicated as $b$ when the lens plate is at a distance of 6" from the evaporating boat plotted on the basis of 100% of evaporating material at the center of the lens plate. If a screen is designed in accordance with the attenuation of the material at the edges as shown in Fig. 5, this screen will compensate for the distribution of the material if the screen is rotated about its central point C during the evaporation of the material in the manner which will be hereinafter described.

Although the screen may be satisfactory for thick coatings, it is not completely satisfactory for very thin coatings or coatings whose thickness must be accurately determined, for the reason that often the screen is not unform, it is difficult to cut with uniformity, it becomes gradually coated with deposited material which changes its transmission, and at the closely adjacent parts of the screen it may interfere with the transmission of material more than the amount calculated.

I have devised a solid shutter which avoids the deficiency of the screen above described and is operated in the same manner. This solid shutter uses a single blade instead of multiple blades of the screen, and it can accordingly be rotated at such a speed that one rotation will not interfere with the passage of the coating material during preceding or subsequent rotations. The rotating mechanism is shown in Fig. 1. The shutter or blade 30 is mounted on a ring 31, which is considerably larger than the articles to be coated, and of approximately the same diameter as the support 15, being slightly smaller so that it can rotate within the limits of the supports 12. On two of the supports 12 there are mounted rollers 32 which support the ring 31. These rollers may be of brass but are preferably of brass with small rubber tires to prevent vibration of the apparatus. On the third leg there is mounted a bearing 37 which carries a shaft 33. The shaft carries on its inner end a roller substantially identical with the rollers 32 and drives that roller to rotate the ring 31. On the outer end of the shaft 33 there is located an iron or steel member 34 which is preferably of a substantially U shape and is supported to rotate just within the bell jar 11. Outside of the bell jar there is located a magnet 35 which is adapted to drive the armature 34 and which is driven by a motor 36. When the motor 36 is operated, the magnet 35 rotates at the same speed, thereby causing rotation of the armature 34 and shaft 33 and causing rotation of the ring 31 which carries the shutter 30 around the axis of transmission of the coating to the work holder or lens plate 13.

In Fig. 8 there is shown in solid lines the relative amount of coating transmitted to the work holder or lens plate when the work holder or lens plate is at a distance of 9" from the evaporating boat. It will be noted that from 100% at the center of the work holder or lens plate the transmission falls to 75% at a radius of 3½" and the difference between these two percentages represents the amount for which correction is required. The dotted lines represent the amount of correction required, and the development of the correction is shown in Fig. 9 as applied to the correcting plate 30 and as tabulated at the bottom of Fig. 8. It will be noted that the width of the correcting plate is inversely proportional to the normal distribution of the evaporated material and that therefore a uniform distribution is secured.

It has already been noted from a consideration of Fig. 8 that the thickness of the coating deposited at a point 3½ inches from the center of the lens plate is only 75 per cent of that deposited at the center. In other words, to effect uniform coating the shutter 30 should obstruct 25 per cent of the vapor from reaching the center of the lens plate, and not afford any obstruction at all to vapor which is to reach points 3½ inches from the center; but the radius of the lens plate at its center is infinitesimally small, and so, therefore, is its circumference. The zone to be shielded from vapor at the center of the lens plate is, therefore, negligible and the width of the shield is thus zero at both of its ends. To take another example, Fig. 8 shows that approximately 23 per cent and 17 per cent of the vapor is to be prevented from reaching points respectively one inch and two inches from the center; but the circumferential zone to be protected at a distance of two inches from the center is twice as great as that which is only one inch away, and the blade or shutter 30 must, therefore, be so designed as to have widths at points respectively one inch and two inches from the center which are in the proportion 23:34. The same considerations apply in determining the width of the blade at all other points from the center, and inspection of Fig. 9 reveals that it has been so designed.

One other factor to be taken into consideration in designing the blade is that the blade 30 is nearer to the evaporating boat than the lens plate. In the example from which the data of Fig. 8 was obtained, the lens plate 13 was nine inches from the evaporating boat while the blade 30 was only 5½ inches away, and the width of the blade is, therefore, reduced in the proportion 18:11 at all points along its axial length. The blade is, of course, symmetrical about the horizontal axis marked "0" in Fig. 9, and is generally elliptical in shape.

The following is a more particular example of how the attenuating blade may be designed to meet a given situation.

As shown by the differences in Figs. 4, 7, and 8 the distribution curve of a material evaporated from a point source to a given surface will vary with the distance from the source to the surface. Figs. 4, 7, and 8 are distribution curves for distances of six, ten, and nine inches respectively. These curves may be calculated with the aid of the formula $$T_1 = \frac{T_0 h^2 \cos^3 \theta}{r^4} = T_0 \cos^4 \theta$$

which formula, as explained more fully in aforementioned Dimmick application, Serial No. 468,915, enables one to find the thickness of an evaporated film at any point. Of course, when the thickness of the film at any point is known, the percent attenuation compared with a point directly opposite the center of the evaporator can also be easily found.

Taking the curve shown in Fig. 8 it is seen that for a lens plate positioned nine inches from an evaporating boat, the thickness of a coating 3½ inches from the center of the plate is only 75 per cent of the thickness at the center. At a distance of 2 inches the thickness is about 92 percent, at a distance of 1 inch, about 98 percent, and so on. In other words the percent attenuation at these three points is about 25 percent, 8 percent, and 2 percent respectively. To find the amount of correction which a correcting device should supply at each of these points in order to provide a uniform coating it is only necessary to subtract each of the above values from 25 percent (the maximum attenuation in this instance). Subtracting we get the values 0, 17, and 23. These values fall on the dotted line curve of Fig. 8.

Obviously, the correcting blade cannot be placed in exactly the same plane as the plane of the surface being coated. It may, however, be placed at any convenient distance therefrom. In the example of Fig. 8, the correcting blade was placed at a distance of 5½ inches from the evaporating boat.

Evaporated material travelling from an evaporating boat to a surface spreads out in the form of a cone (in this case inverted.) A correcting blade placed somewhere between the apex and the base of this cone would have a radius which is dependent upon its position. That is, the ratio of the radius of the blade to the radius of the surface being coated is the same as the ratio of the distance between the evaporator and the blade to the distance between the evaporator and the surface. In the example shown in Fig. 8 the latter ratio is seen to be 5½:9 or 11:18. Multiplying any given radius of the lens plate, as found at the bottom of Fig. 8, by this ratio, gives the corresponding radius of the correcting plate. For instance the length of correcting blade corresponding to a lens plate having a radius of 3½ inches equals 3½ multiplied by 11/18 or 2.14 inches. For values of 2 inches and 1 inch on the lens plate, the corresponding values on the correcting plate are seen to be 1.22 and 0.60 inches.

To further investigate the example of Fig. 8 and obtain enough points to plot a smooth curve such as shown in Fig. 9, a number of points along the radius of the lens plate or converted to the corresponding values along the radius of the correcting plate by multiplying the former values by 11/18. A series of these calculated values is shown at the bottom of Fig. 8 immediately above the caption "Radius of correcting plate."

As mentioned previously, Fig. 9 shows the actual values for a correcting plate constructed to fit the example of Fig. 8. The circumferential width at any given radius of the correcting plate is found simply by multiplying the length of the circumference of a circle having said radius by the percent attenuation desired at that point. For example, at a radius of 0.60 inch on the correcting plate the correction required, as read from the dotted line curve of Fig. 8, is about 23 per cent. The circumference of a circle having a radius of 0.60 inch is about 3.77 inches. Taking 23 percent of this value gives a result of about .87 inch which corresponds with the value as plotted in Fig. 9. All other points on the curves of Fig. 9 are calculated in a similar manner.

The above figures were calculated on the basis of obtaining a uniform coating. If some other distribution of coating, i. e., attenuation, were desired, the shape of the blade could be calculated in an analogous manner.

I claim as my invention,

1. In a vacuum coating apparatus, a work holder and plurality of evaporating means, means for selectively shifting each of the evaporating means into axial alignment with the work holder from the exterior of the device, and means for selectively actuating the evaporating means thus aligned.

2. In a vacuum coating apparatus, a work holder and plurality of evaporating means, magnetic means for selectively shifting each of the evaporating means into axial alignment with the work holder from the exterior of the device, and means for selectively actuating the evaporating means thus aligned.

3. In a vacuum coating apparatus, a work holder and a carrier carrying a plurality of evaporating means, means for shifting the carrier from the exterior of the apparatus to shift each of the evaporating means selectively into axial alignment with the work holder, and means for selectively actuating the evaporating means thus aligned.

4. In a vacuum coating apparatus, a work holder and a carrier carrying a plurality of evaporating means, magnetic means for shifting the carrier from the exterior of the apparatus to shift each of the evaporating means selectively into axial alignment with the work holder, and means for selectively actuating the evaporating means thus aligned.

5. In a vacuum coating apparatus, a work holder, a plurality of evaporating means, means for shifting each of said evaporating means selectively into axial alignment with the work holder and for selectively actuating the evaporating means thus aligned, and rotatable means between the evaporating means and the work holder for securing uniform distribution of the evaporated material.

6. In a vacuum coating apparatus, a work holder, a plurality of evaporating means, means for shifting each of said evaporating means selectively into axial alignment with the work holder and for selectively actuating the evaporating means thus aligned, rotatable means between the evaporating means and the work holder for securing uniform distribution of the evaporated material, and means for reversing the position of the work holder to expose the other side of the work.

7. In a vacuum coating apparatus a work holder, a plurality of evaporating means mounted on a carrier, means or shifting the carrier from the exterior of the apparatus to shift each of the evaporating means selectively into axial alignment with the work holder, means for selectively actuating the evaporating means thus aligned, rotatable means between the evaporating means and the work holder for securing uniform distribution of the evaporated material, means for driving the said rotatable means, and means for rotating the work holder.

8. In a vacuum coating apparatus a work holder, a plurality of evaporating means mounted on a carrier, means for shifting the carrier from the exterior of the apparatus to shift each of the evaporating means selectively into axial alignment with the work holder, means for selectively actuating the evaporating means thus aligned, rotatable means between the evaporating means and the work holder for securing uniform distribution of the evaporated material, motor driven means for driving the said rotatable means, and means for rotating the work holder.

9. In a vacuum coating apparatus a work holder, a plurality of evaporating means mounted on a carrier, means for shifting the carrier from the exterior of the apparatus to shift each of the evaporating means selectively into axial alignment with the work holder, means for selectively actuating the evaporating means thus aligned, rotatable means between the evaporating means and the work holder for securing uniform distribution of the evaporated material, motor driven means for driving the said rotatable means, and magnetic means for rotating the work holder.

10. In a vacuum coating apparatus a work holder, a plurality of evaporating means mounted on a carrier, means for shifting the carrier from the exterior of the apparatus to shift each of the evaporating means selectively into axial alignment with the work holder, means for selectively actuating the evaporating means thus aligned, rotatable means between the evaporating means and the work holder for securing uniform distribution of the evaporated material, motor driven magnetic means for driving the said rotatable means, and magnetic means for rotating the work holder.

11. In a vacuum coating apparatus a work holder, a plurality of evaporating means mounted on a carrier, magnetic means for shifting the carrier from the exterior of the apparatus to shift each of the evaporating means selectively into axial alignment with the work holder, means for selectively actuating the evaporating means thus aligned, rotatable means between the evaporating means and the work holder for securing uniform distribution of the evaporated material, motor driven means for driving the said rotatable means, and magnetic means for rotating the work holder.

12. In a vacuum coating apparatus a work holder, a plurality of evaporating means mounted on a carrier, magnetic means for shifting the carrier from the exterior of the apparatus to shift each of the evaporating means selectively into axial alignment with the work holder, means for selectively actuating the evaporating means thus aligned, rotatable means between the evaporating means and the work holder for securing uniform distribution of the evaporated material, motor driven magnetic means for driving the said rotatable means, and magnetic means for rotating the work holder whereby a plurality of coats of different material may be applied to the work carried on said work holder without breaking the vacuum in said apparatus.

13. In apparatus for the deposition of evaporated material upon a circular portion of a work surface, the combination of an evaporator, a work holder in opposed relation thereto, and a rotatable attenuator in the form of a blade for securing a distribution of said material over said surface, means for rotating said blade, said blade being interposed between said holder and said evaporator and rotatable about the axis of transmission of said material to said work surface, the ratio of the radius of the circular path defined by the point of said blade farthest from said axis of transmission, to the radius of said work surface, being in direct proportion to the ratio of the distance between evaporator and blade to the distance between evaporator and work surface.

14. The apparatus of claim 13 in which said blade is substantially elliptical in shape and in which said blade has an end in register with said axis of transmission.

GLENN LESLIE DIMMICK.

Certificate of Correction

Patent No. 2,410,720.      November 5, 1946.

GLENN LESLIE DIMMICK

It is hereby certified that errors appear in the printed specification of the above numbered patent requiring correction as follows: Column 5, line 65, for "or" before "converted" read *are*; column 6, line 70, claim 7, for the word "or" before "shifting" read *for*; and that the said Letters Patent should be read with these corrections therein that the same may conform to the record of the case in the Patent Office.

Signed and sealed this 28th day of January, A. D. 1947.

[SEAL]

LESLIE FRAZER,
*First Assistant Commissioner of Patents.* and the work holder for securing uniform distribution of the evaporated material, means for driving the said rotatable means, and means for rotating the work holder.

8. In a vacuum coating apparatus a work holder, a plurality of evaporating means mounted on a carrier, means for shifting the carrier from the exterior of the apparatus to shift each of the evaporating means selectively into axial alignment with the work holder, means for selectively actuating the evaporating means thus aligned, rotatable means between the evaporating means and the work holder for securing uniform distribution of the evaporated material, motor driven means for driving the said rotatable means, and means for rotating the work holder.

9. In a vacuum coating apparatus a work holder, a plurality of evaporating means mounted on a carrier, means for shifting the carrier from the exterior of the apparatus to shift each of the evaporating means selectively into axial alignment with the work holder, means for selectively actuating the evaporating means thus aligned, rotatable means between the evaporating means and the work holder for securing uniform distribution of the evaporated material, motor driven means for driving the said rotatable means, and magnetic means for rotating the work holder.

10. In a vacuum coating apparatus a work holder, a plurality of evaporating means mounted on a carrier, means for shifting the carrier from the exterior of the apparatus to shift each of the evaporating means selectively into axial alignment with the work holder, means for selectively actuating the evaporating means thus aligned, rotatable means between the evaporating means and the work holder for securing uniform distribution of the evaporated material, motor driven magnetic means for driving the said rotatable means, and magnetic means for rotating the work holder.

11. In a vacuum coating apparatus a work holder, a plurality of evaporating means mounted on a carrier, magnetic means for shifting the carrier from the exterior of the apparatus to shift each of the evaporating means selectively into axial alignment with the work holder, means for selectively actuating the evaporating means thus aligned, rotatable means between the evaporating means and the work holder for securing uniform distribution of the evaporated material, motor driven means for driving the said rotatable means, and magnetic means for rotating the work holder.

12. In a vacuum coating apparatus a work holder, a plurality of evaporating means mounted on a carrier, magnetic means for shifting the carrier from the exterior of the apparatus to shift each of the evaporating means selectively into axial alignment with the work holder, means for selectively actuating the evaporating means thus aligned, rotatable means between the evaporating means and the work holder for securing uniform distribution of the evaporated material, motor driven magnetic means for driving the said rotatable means, and magnetic means for rotating the work holder whereby a plurality of coats of different material may be applied to the work carried on said work holder without breaking the vacuum in said apparatus.

13. In apparatus for the deposition of evaporated material upon a circular portion of a work surface, the combination of an evaporator, a work holder in opposed relation thereto, and a rotatable attenuator in the form of a blade for securing a distribution of said material over said surface, means for rotating said blade, said blade being interposed between said holder and said evaporator and rotatable about the axis of transmission of said material to said work surface, the ratio of the radius of the circular path defined by the point of said blade farthest from said axis of transmission, to the radius of said work surface, being in direct proportion to the ratio of the distance between evaporator and blade to the distance between evaporator and work surface.

14. The apparatus of claim 13 in which said blade is substantially elliptical in shape and in which said blade has an end in register with said axis of transmission.

GLENN LESLIE DIMMICK.

Certificate of Correction

Patent No. 2,410,720. November 5, 1946.

GLENN LESLIE DIMMICK

It is hereby certified that errors appear in the printed specification of the above numbered patent requiring correction as follows: Column 5, line 65, for "or" before "converted" read *are*; column 6, line 70, claim 7, for the word "or" before "shifting" read *for*; and that the said Letters Patent should be read with these corrections therein that the same may conform to the record of the case in the Patent Office.

Signed and sealed this 28th day of January, A. D. 1947.

[SEAL]

LESLIE FRAZER,
*First Assistant Commissioner of Patents.*